United States Patent [19]

Richards

[11] Patent Number: 4,858,860
[45] Date of Patent: Aug. 22, 1989

[54] SIDE-LOAD TYPE PIPE HANGER WITH SINGLE BOLT CLOSURE AND LINER PROTECTING INSERT

[75] Inventor: Peter S. Richards, Issaquah, Wash.
[73] Assignee: Progressive Fastening, Inc., Seattle, Wash.
[21] Appl. No.: 273,603
[22] Filed: Nov. 21, 1988

Related U.S. Application Data

[63] Continuation of Ser. No. 047,182, May 6, 1987, abandoned.

[51] Int. Cl.[4] .............................................. F16L 3/10
[52] U.S. Cl. ..................................... 248/62; 248/74.1
[58] Field of Search ....................... 248/62, 65, 63, 59, 248/74.1, 72, 58, 68.1

[56] References Cited

U.S. PATENT DOCUMENTS

| 2,339,564 | 1/1944 | Goldberg et al. | 248/62 |
| 2,846,169 | 8/1958 | Sullivan | 248/62 |
| 3,404,858 | 10/1968 | Levy | 248/68.1 |
| 3,517,901 | 6/1970 | Jenkins | 248/327 X |
| 4,570,703 | 2/1986 | Ringsmuth et al. | 248/68.1 X |

Primary Examiner—Alvin C. Chin-Shue
Attorney, Agent, or Firm—Delbert J. Barnard

[57] ABSTRACT

A bolt (42) is inserted threaded end (56) first upwardly through a first opening (68) within a lower arm portion (14) of a C-shaped saddle (12), then through an opening (70) in a lower end portion (34) of an insert (28), then through an opening (72) in the upper end portion (32) of the insert (28), and then through an opening (66) in the upper arm portion (16) of the saddle (12). The opening (68) is hexagonal in shape. A nut (44) is then installed on the bolt (42). The nut (44) has a small end portion (48) which is hexagonal in shape. The nut (44) is hand tightened and then is aligned with the opening (66) so that the small end portion (48) will drop into the opening (66). A wrench is then used on the bolt head (46) for rotating the bolt (42) for the purpose of drawing the nut (44) and the bolt (42) together and applying a clamping force on a pipe (26) which is within the saddle (10). A central portion (30) of the insert (28) bears on a portion of liner (24) which surrounds the pipe (26) an opposite portion of the liner (24) contacts a bight (18) portion of the saddle (12). The tightening of the nut (44) and bolt (42) pushes the central portion (30) of the insert (28) tight against the liner (24).

6 Claims, 2 Drawing Sheets

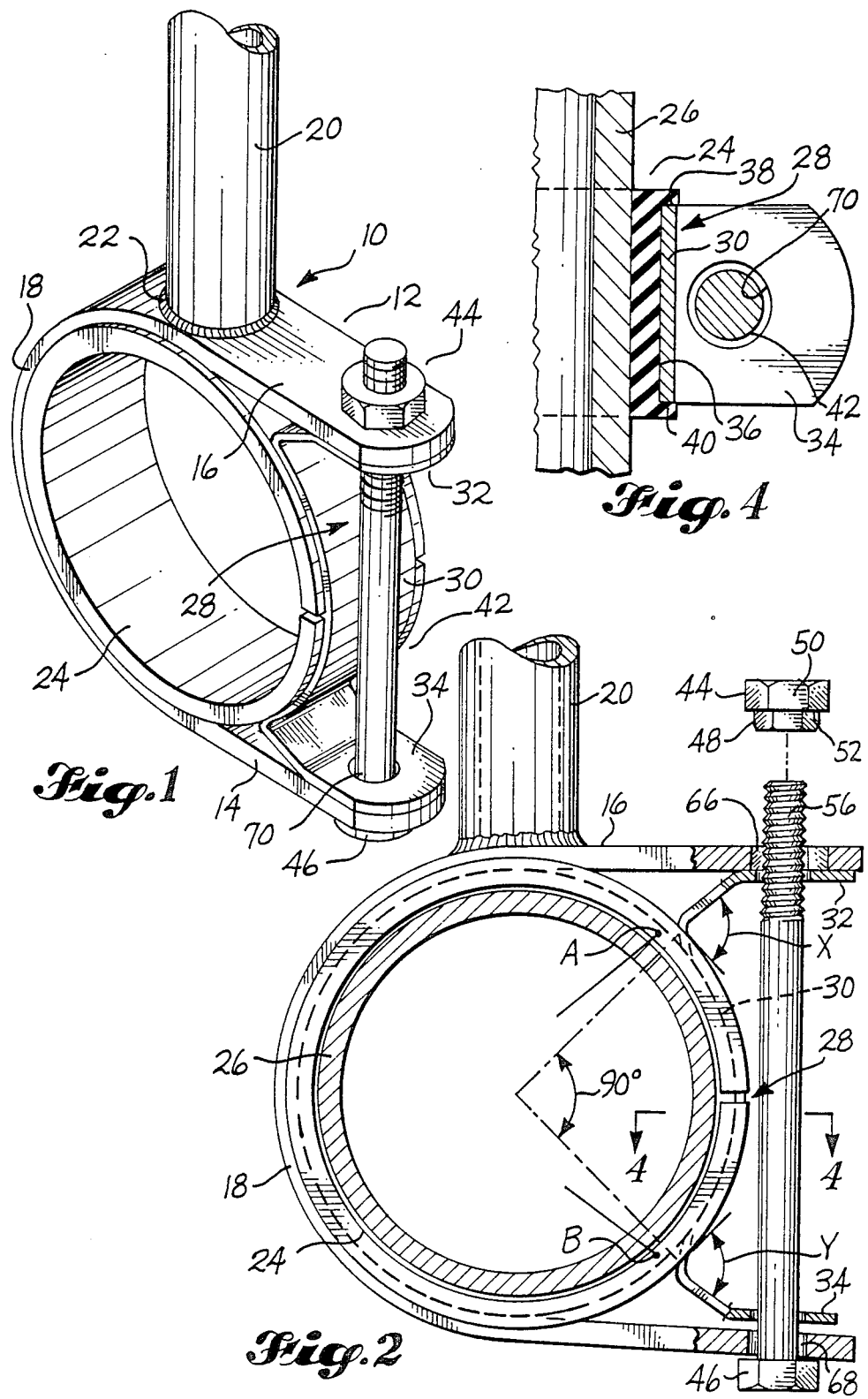

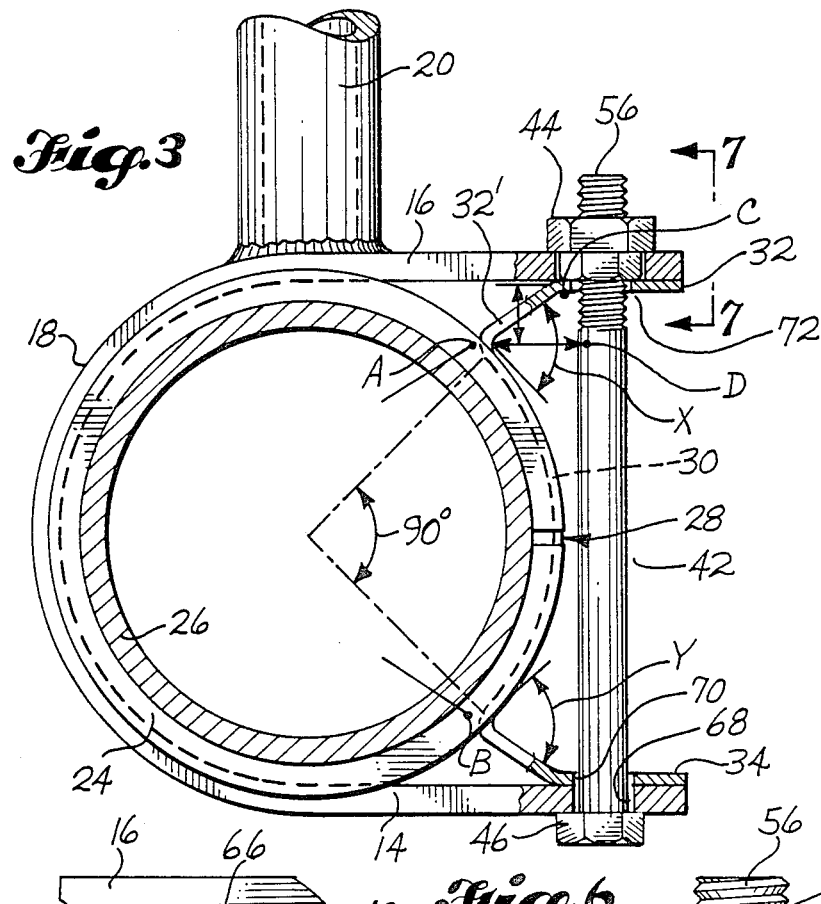
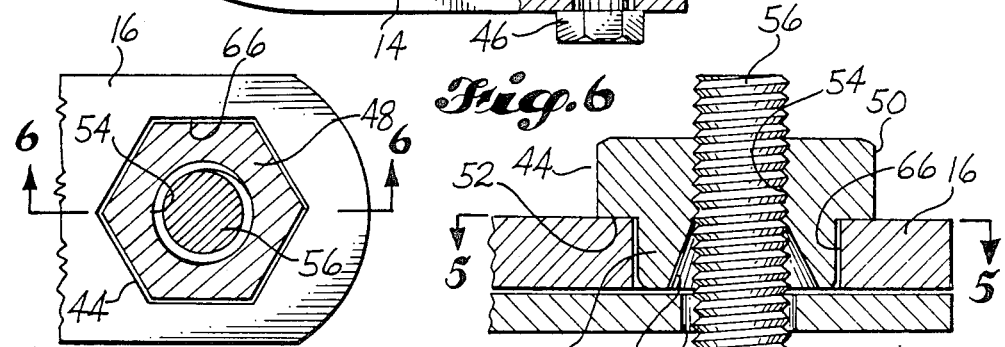
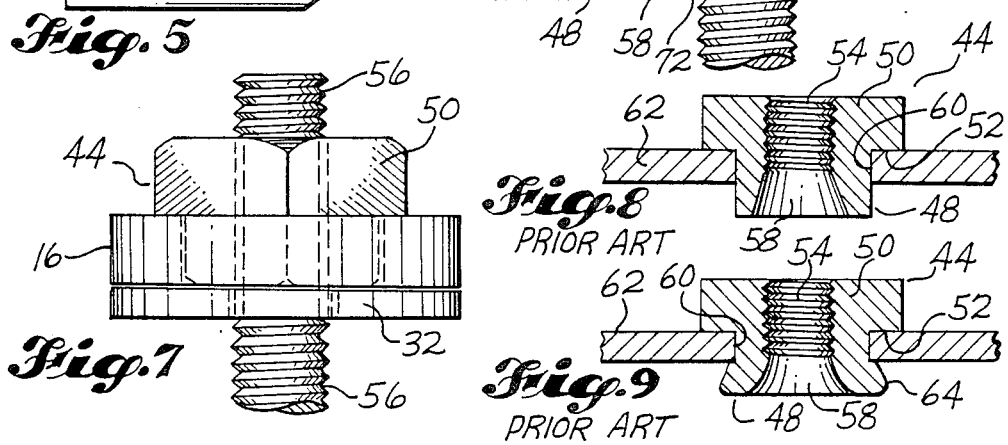

SIDE-LOAD TYPE PIPE HANGER WITH SINGLE BOLT CLOSURE AND LINER PROTECTING INSERT

This application is a continuation, , of application Ser. No. 07/047,182, filed May 6, 1987 now abandoned.

1. Technical Field

This invention relates to pipe hangers. More particularly, it relates to an improved way of retaining a pipe and liner within the hanger, and to a way of holding the liner against the pipe on the open side of the hanger.

2. Background Art

The present invention relates to an improvement of the type of hanger disclosed by my pending application Ser. No. 730,285, filed May 3, 1985, and entitled Side-Load Type Pipe Hanger With Single Bolt Closure. Such hanger comprises a saddle having an opening through which the pipe is moved sideways for positioning it within the saddle. A bolt is inserted between opposed end portions of the saddle. A nut is applied to a threaded end of the bolt. And, the bolt is rotated relative to the nut for the purpose of applying a squeezing pressure on the pipe.

The prior art practice is to wrap a liner around the portion of the pipe which is inserted in the saddle. This liner is sandwiched between the pipe and the closed end of the saddle. At the open or bolt end of the saddle the liner is bent so that it is positioned between the sidewall of the pipe and the bolt. A potential problem with this type of arrangement is that in response to shock loads acting on the hanger, the bolt may actually cut into the liner. If this should happen, the pipe section would become loose in the hanger and could move and cause damage in response to additional shock load.

U.S. Pat. No. 3,517,901, granted June 30, 1970 to John C. Jenkins, discloses the use of a flat metal locking bar in place of a bolt. This locking bar places a relatively wide flat surface against the liner. Thus, the locking bar is less likely to cut into the liner. However, as discussed in great detail in my aforementioned copending application Ser. No. 730,285, there are other problems which are experienced when a locking bar is used. It is an object of the present invention to provide a liner contacting protective insert in combination with the nut and bolt closure assembly that forms the subject matter of my application Ser. No. 730,285, so that the advantages of the nut and bolt closure arrangement are obtained without the pipe liner being damaged by the bolt.

The claimed subject matter of application Ser. No. 730,285 has been in commercial use long enough so that it is now prior art with respect to the subject invention.

Disclosure of the Invention

In basic form the pipe hanger of the invention comprises a generally C-shaped saddle. Such saddle comprises a pair of spaced apart arm portions and an interconnecting bight portion. A support leg member is connected to the saddle. A first bolt receiving opening is formed in one of the arm portions of the saddle. A second bolt receiving opening is formed in the second arm portion of the saddle. A bolt is provided which comprises a rod body, an enlarged head at a first end of the rod body, and a threaded end portion at a second end of the rod body. A nut is provided which includes a central opening that is threaded with threads which match the threads on the bolt. A liner is provided and the liner is of a length to extend about the section of pipe that is to be placed in the saddle.

In accordance with the invention, a liner bracing insert is provided. This insert comprises an arcuate central portion shaped and positioned to contact the liner on the side of the pipe section opposite the bight portion of the saddle. The insert also includes spaced apart end portions which are connected to the central portion and extend therefrom into positions endwardly adjacent the arm portions of the saddle. These end portions include bolt receiving openings which are aligned with the bolt receiving openings in the arm portions of the saddle when the insert is in place within the saddle. This construction and arrangement of the saddle and insert allow a pipe section to be placed within the saddle, with the liner surrounding it. A portion of the liner is put into contact with the bight portion of the saddle. The insert is placed within the saddle with its arcuate central portion against the liner on the side of the pipe section opposite the bight portion of the saddle. The bolt is inserted on the side of the pipe section opposite the bight portion of the saddle. The bolt is inserted through first the opening in a first arm portion of the saddle, then through the opening in a first end portion of the insert, then through the opening in the second end portion of the insert, then through the opening in the second arm portion of the saddle. Then the nut is applied to the bolt and tightened for exerting a clamping force on the pipe section.

In accordance with an aspect of the invention, the central portion of the insert has an arc length that is greater than ninety degrees 90°). Each end portion of the insert extends outwardly from the central portion of the insert at an angle less than ninety degrees 90°) relative to a tangent where the end portion connects to the central portion. As a result of this construction and arrangement, a squeezing force applied to the end portions of the insert by a tightening of the nut and bolt assembly will cause the arcuate portion of the insert to increase the pressure which it exerts on the liner.

Other more specific details of construction are hereinafter described as a part of the description of the best mode of the invention.

These and other features, advantages and characteristics of the invention will be apparent from the embodiment of the invention which is illustrated and described below in connection with the drawing.

BRIEF DESCRIPTION OF THE DRAWING

Like reference numerals are used to designate like parts throughout the several views of the drawing, and:

FIG. 1 is a pictorial view of an embodiment of the invention;

FIG. 2 is an elevational view of the embodiment shown by FIG. 1, showing the nut in spaced alignment with the threaded portion of the bolt, and showing a pipe in place;

FIG. 3 is a view like FIG. 2, but showing the nut installed;

FIG. 4 is a sectional view taken substantially along line 4—4 of FIG. 2;

FIG. 5 is a sectional view taken substantially along line 5—5 of FIG. 6;

FIG. 6 is a sectional view taken substantially along line 6—6 of FIG. 5;

FIG. 7 is an end view taken substantially from the position indicated by line 7—7 in FIG. 3;

FIG. 8 is a view of a prior art nut shown inserted in a hole in a piece of sheet metal; and FIG. 9 is a view like FIG. 8, but showing the leading portion of the nut curled back onto the sheet metal, which is the normal installation mode.

BEST MODE FOR CARRYING OUT THE INVENTION

Referring to FIGS. 1-3, the hanger 10 comprises a U-shaped saddle 12 having a side opening. Saddle 12 comprises first and second arm portions 14, 16 and an interconnecting bight portion 18. In preferred form, a support post 20 is welded to the arm portion 16 at a position which places the center line of the post member 20 in intersecting alignment with the center of radius of the bight portion 18. As shown, a weld bead 20 may extend entirely around the circumference of the post member 20. A cylindrical post member is illustrated. However, it is to be understood that the shape of the post member is a variable.

In accordance with the present invention, the saddle 10 is equipped with an elastomeric liner 24 which is of a length to extend substantially entirely around the circumference of the pipe section 26 which is received within the saddle 10.

Also in accordance with the invention, an insert 28 is provided to make contact with the portion of the insert 24 which is diametrically opposite the bight 18. As shown by FIGS. 1-3, the insert 28 includes an arcuate central portion 30 and a pair of opposite end portions 32, 34. As shown by FIGS. 2 and 3, the central portion 30 of the insert 28 has an arc length, measured from about point A to about point B, that is larger than ninety degrees 90°). The end portions 32, 34 have inner parts which extend outwardly from the central portion 30 at angles x and y which are smaller than ninety degrees 90°). In preferred form, a small radius bend exists between the inner part each end portion 32, 34 and the central portion 30 of the insert 28. The inner parts of the end portions 32, 34 then extend outwardly generally straight until they approach the arm portions 14, 16 of the saddle 12. Then they change direction and extend as outer parts substantially parallel to the arm portions 14, 16.

As best shown by FIGS. 1 and 4, the liner 24 is channel shaped in cross-section. It comprises a web 36 and a pair of flanges 38 which extend generally perpendicular to the web 36. The saddle portions 14, 16, 18 and the insert portions 30, 32, 34 are substantially equal in width and are substantially equal to the width of the web 36 between the flanges 38, 40. As illustrated, the flanges 38, 40 outwardly bound the side edges of the saddle 12 and the insert 30 in the regions where the web 36 contacts the saddle 12 and the insert 30.

The hanger 10 also includes a bolt 42 and a nut 44. The bolt 42 includes a head 46. The nut 44 comprises a first small end portion 48, a second large end portion 50, and a shoulder 52 defined where the two end portions 102, 104 meet. Nut 44 includes a threaded central opening 54 having matching threads to the threads 56 on bolt 42. Nut 44 may also include a non-threaded entry 58.

As shown by FIGS. 1-7, the large end portion 50 of the nut 44 is hexagonal and the small end portion 48 is also hexagonal. Regarding the small end portion 48, it is only functionally important that this portion be noncircular in cross-section.

The particular nut 44 that is illustrated is a known article of commerce. FIGS. 8 and 9 illustrate the known use of the nut construction that is illustrated. The nut in these figures is also designated 44. Referring to Figs. 8 and 9, a hexagonal opening 60 is formed in a piece of sheet metal 62. Opening 60 is sized to snugly receive the small end portion 48 of the nut 44. The shoulder 52 rests against the sheet metal 62 where it immediately surrounds the opening 60. As shown by FIG. 9, the small end portion 48 is sized to extend through the opening 60 and then beyond the sheet metal member 62. Then, it is "rolled" back against the sheet metal, as shown by 64, for the purpose to in this manner secure the nut 44 to the sheet metal 62. The conical shape 58 was provided for the purpose of facilitating the rolling of the portion 48 back onto the sheet metal 62.

In accordance with the present invention, the small end portion 48 of nut 44 is sized to be snugly received within an opening 66 formed in arm portion 16 (FIG. 6) but there is no projecting portion which is turned over for permanently securing the nut 44 in place. Rather, the opening 66 functions as a "box" wrench for holding the end portion 48, and hence nut 44, against turning when the end portion 48 is within the opening 90.

As shown by FIGS. 2 and 3, the lower opening 68 is oversized relative to the rod body of bolt 42. The opening 66 is substantially larger than the upper end portion 56 of the bolt 42.

The end portions 32, 34 of the insert 28 include bolt receiving openings 70, 72.

In accordance with an aspect of the invention, a liner 24 is wrapped around a pipe section 26 and the pipe section 26 and liner 24 are moved sideways into the open throat of the saddle 12. The liner 24 is moved until its web 36 makes contact with the bight portion 18 of the saddle 12 and the flanges 36, 40 are positioned outwardly of the side edges of the bight portion 18. Then, the opposite ends of the liner 24 are brought together and the insert 28 is inserted, with its arcuate portion 30 positioned between the flanges 38, 40 and against the web 36. This positioning places the openings 70, 72 in the insert 28 in substantial alignment with the openings 68, 66 respectively in the arm portions 14, 16 of saddle 12. Next the bolt 42 is moved upwardly through first opening 68, then opening 70, then opening 72 and then opening 66. Next, the nut 44 is brought into engagement with the threaded portion 56 of the bolt 42, with the small diameter end portion 48 of the nut 44 directed downwardly. The conical region 58 that was formed for the purpose of adapting the end portion 48 for rolling over the sheet metal edge (FIGS. 8 and 9) now serves to guide the threaded end portion 56 of bolt 42 into the threaded region 54 of the nut 44. The nut 44 is screwed onto the threads 56 by hand. This may be done with the bolt 46 held upwardly so that the nut can be rotated. If so, the assembly is next allowed to drop downwardly, to place the end portion 48 of nut 44 into the opening 66. Opening 66 now functions as a box wrench, enabling a single wrench to be used on the bolt head 46, for rotating the bolt 42 in an amount sufficient to apply the necessary squeezing or clamping force on the pipe 26.

Referring to FIG. 6, when the nut end portion 48 is within opening 66, and the bolt 42 is tightened, something else happens. The side surfaces of the nut portion 48 are moved into contact with the side surfaces of the opening 66. As the bolt head 36 and the nut 44 are drawn together, the shoulder 52 is drawn into tight engagement with the metal surrounding openings 66.

The tight fit of nut end portion 48 within the opening 66, and the pressure exerted by the shoulder 52 against the region of the upper arm portion 16 which surrounds the opening 66, serves to stiffen the part of arm portion 16 which extends outwardly from the support leg 20, so that it does not want to bend. The rod body of bolt 42 makes a relatively loose fit within the opening 68. As a result, the nut and bolt assembly are automatically moved by the turning force on bolt head 46 into a position in which the axis of the bolt 42 extends substantially perpendicular to the surface of arm portion 16 against which shoulder 52 bears. The inner surface of bolt head 46 exerts a force on the lower arm portion 14. The lower arm portion 14 has a relatively long unsupported span and as a result it can bend much more freely than the upper arm portion 16. Thus, the clamping pressure is applied to the pipe 26 by the lower arm portion 14 bending upwardly toward the upper arm portion 16. The loose fit of bolt 42 in the opening 68 allows relative movement to occur between the bolt 42 and the lower arm portion 14, so that bending is not apt to occur between the bolt 42 and the surfaces of opening 68, in a manner tending to resist upper deflection of the arm portion 14.

As the nut and bolt 42, 44 are screwed together, the arm portions 14, 16 move relatively together. In turn, a squeezing pressure is exerted on the end portions 32, 34 of insert 28. The fact that the liner contacting central portion 30 of insert 28 has an arc length that is greater than ninety degrees 90°), causes the central portion 30 of insert 28 to increase its pressure on the liner web 36 as the nut and bolt assembly 44, 42 is tightened.

Referring to FIG. 3, the portion 32, of end portion 32 of the insert 28, extending from a point of contact C of the bolt 42 with opening 72 in end member 32, generally diagonally inwardly to point A, forms the hypotenuse of a triangle. The distance between points C and D form a first leg of the triangle. The distance between points A and D form a second leg of the triangle. As will be apparent, a shortening of the bolt 42, attended by a moving together of the end portions 32, 34 of the insert 28, will shorten triangle leg C-D and at the same time will lengthen triangle leg A-D. The same thing happens at the lower end of the insert 28. As a result, the arcuate center portion of the insert 28 is moved to the left (as pictured in FIG. 3), and against the central portion 36 of the liner 24. It is in this manner that the insert 28 exerts a squeezing pressure on the liner 24 in response to a tightening of the nut 44 on the bolt 42.

Various modifications can be made in the construction of the hanger and the insert without departing from the spirit of the invention. The invention is not to be defined by the illustrated embodiment, which is provided for example purposes, but rather by the claims. The claims are to be interpreted in accordance with the established rules of patent claim interpretation, including the use of the doctrine of equivalents.

What is claimed is:

1. A pipe hanger, comprising:
    a generally C-shaped saddle comprising a pair of spaced apart arm portions and an interconnecting semi-circular bight portion, and a support leg member connected to said saddle wherein a pipe is side loaded into said saddle by moving it sideways into said saddle through an entry opening defined by and between the arm portions; and
    an improved system for securing a pipe section within the C-shaped saddle, comprising;
    a first bolt receiving opening in one of said arm portions;
    a second bolt receiving opening in the second arm portion;
    a clamping bolt comprising a rod body, an enlarged head at a first end of said rod body and a threaded end portion at a second end of said rod body;
    a nut including a central opening that is threaded with threads which complement the threads on the bolt;
    said openings in said arm portions being sized so that the bolt has a substantially fixed position relative to the saddle when the bolt and nut are threaded together and tightened;
    a generally circular liner for a section of pipe of a length to extend around said section of pipe;
    a liner bracing insert for said saddle comprising
    a circular central portion having an arc length that is greater than ninety degrees (90°) and being shaped and positioned to contact the generally circular liner on the side of the pipe section opposite the bight portion of the saddle, and spaced apart end portions connected to the central portion and extending therefrom into positions inwardly adjacent the arm portions of the saddle, each said end portion of the insert having an inner part which extends outwardly from the central portion of the insert at an angle between it and the central portion less than ninety degrees (90°) relative to a tangent where the end portion connects to the central portion, each said end portion of the insert also including an outer part which extends contiguous an arm portion of the saddle and makes an angle with the inner part which is greater than ninety degrees (90°), said outer parts including generally circular bolt receiving openings aligned with the bolt receiving openings in the arm portions of the saddle; and
    said bolt receiving openings in said end portions of said insert having border portions which contact the bolt when the bolt is tightened so as to anchor the end portions of the insert in position relative to the bolt;
    whereby in use a pipe section is placed within said saddle, with the generally circular liner surrounding it, and with a semi-circular portion of the liner in contact with the semi-circular bight portion of the saddle, and the insert is placed within the saddle with its circular central portion against the generally circular liner on the side of the pipe section opposite the bight portion of the saddle, and the bolt is inserted through first the bolt receiving opening in a first arm portion of the saddle, then through the generally circular opening in a first end portion of the insert, then through the generally circular opening in the second end portion of the insert, then through the bolt receiving opening in the second arm portion of the saddle, and then the nut is applied to the bolt and tightened and such tightening fixes the bolt in position and squeezes the end portions of the insert together and in response to such squeezing and said contact between the bolt and the end portions of the bolt receiving openings in the end portions of the insert the central portion of the insert is displaced sideways towards the generally circular liner for exerting a clamping force on the liner and the pipe section.

2. A pipe hanger according to claim 1, wherein the insert and the saddle have substantially equal width dimensions and the liner comprises a web which contacts both the saddle and the insert and flanges which extend substantially perpendicular to the web outwardly adjacent opposite side edges of the saddle and the insert.

3. A pipe hanger according to claim 1, wherein said nut includes a small size first end portion having a cross-sectional shape that is other than circular, and a large size second portion;

wherein the first opening in a first one of the arm portions of the saddle is smaller in size than the head of the bolt but is larger in size than the rod body of the bolt, and said rod body of the bolt is sized to make a loose fit in the first opening; wherein the second opening in the second arm portion of the saddle is substantially larger in size than the rod body of the bolt, so that the rod body also fits loosely in said second opening, and said second opening is smaller in size than the second end portion of the nut, and is sized and complementarily shaped to snugly receive the small size first end portion of the nut;

whereby the small end portion of the nut can be inserted into the second opening and held by the second opening against rotation while the bolt is being rotated to tighten the screw connection between the bolt and the nut.

4. A pipe hanger according to claim 3, wherein the support leg is connected to the second arm portion, so that the nut will be on the same side of the C-shaped saddle as the support leg member, wherein the support leg member is welded to the second arm portion, and wherein the snug engagement of the small end of the nut within the second opening, backed by the large end of the nut pressing against the second arm portion, results in the nut and bolt assembly substantially stiffening the second end portion as the nut and bolt assembly are drawn together, so that at least most bending of the saddle will occur within the first arm portion.

5. A pipe hanger according to claim 4, wherein the insert and the saddle have substantially equal width dimensions and the liner comprises a web which contacts both the saddle and the insert and flanges which extend substantially perpendicular to the web outwardly adjacent opposite side edges of the saddle and the insert.

6. A pipe hanger, comprising:
a generally C-shaped saddle comprising a pair of spaced apart arm portions and an interconnecting bight portion, and a support leg member connected to said saddle; and
an improved system for securing a pipe section within the C-shaped saddle, comprising:
a first bolt receiving opening in one of said arm portions;
a second bolt receiving opening in the second arm portion;
a clamping bolt comprising a rod body, an enlarged head at a first end of said rod body and a threaded end portion at a second end of said rod body;
a nut including a central opening that is threaded with threads which complement the threads on the bolt;
said openings in said arm portions being sized so that the bolt has a substantially fixed position when the bolt and nut are threaded together and tightened;
an insert for said saddle comprising an arcuate central portion having an arc length that is greater than ninety degrees (90°) and being shaped and positioned contiguous the side of the pipe section opposite the bight portion of the saddle, and spaced apart end portions connected to the central portion and extending therefrom into positions inwardly adjacent the arm portions of the saddle, each said end portion of the insert having an inner part which extends outwardly from the central portion of the insert at an angle between it and the central portion of the insert that is less than ninety degrees (90°) relative to a tangent where the end portion connects to the central portion, each said end portion of the insert also including an outer part which extends contiguous an arm portion of the saddle and makes an angle with the inner part which is greater than ninety degrees (90°), said outer parts including generally circular bolt receiving openings aligned with the bolt receiving openings in the arm portions of the saddle; and
said bolt receiving openings in said end portions of said insert having border portions which contact the bolt when the bolt is tightened so as to substantially anchor the end portions in position relative to the bolt;
whereby in use a pipe section is placed within said saddle, the insert is placed within the saddle with its arcuate central portion towards the side of the pipe section opposite the bight portion of the saddle, and the bolt is inserted through first the bolt receiving opening in a first arm portion of the saddle, then through the generally circular opening in the second end portion of the insert, then through the generally circular opening in a first end portion of the insert, then through the generally circular opening in the second end portion of the insert, then through the bolt receiving opening in the second arm portion of the saddle, and then the nut is applied to the bolt and tightened and such tightening fixes the bolt in position and squeezes the end portions of the insert together and in response to such squeezing and said contact between the bolt and the border portions of the openings in the end portions the central portion of the insert is displaced sideways towards the pipe section for exerting a clamping force on the pipe section.

* * * * *